(12) United States Patent
Gopalakrishnan et al.

(10) Patent No.: US 11,480,421 B2
(45) Date of Patent: Oct. 25, 2022

(54) ELECTRIC POWERTRAIN WITH ROTARY ELECTRIC MACHINE AND POSITION SENSOR-TO-CONTROLLER INTERFACE

(71) Applicant: GM GLOBAL TECHNOLOGY OPERATIONS LLC, Detroit, MI (US)

(72) Inventors: Suresh Gopalakrishnan, Troy, MI (US); Shuqing Zeng, Sterling Heights, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 469 days.

(21) Appl. No.: 16/776,812

(22) Filed: Jan. 30, 2020

(65) Prior Publication Data

US 2021/0239449 A1 Aug. 5, 2021

(51) Int. Cl.
 *G01B 7/30* (2006.01)
 *G08C 23/04* (2006.01)
 *B60L 15/06* (2006.01)
 *B60W 10/08* (2006.01)

(52) U.S. Cl.
 CPC .............. *G01B 7/30* (2013.01); *B60L 15/06* (2013.01); *B60W 10/08* (2013.01); *G08C 23/04* (2013.01); *B60L 2240/421* (2013.01); *B60L 2240/423* (2013.01)

(58) Field of Classification Search
 None
 See application file for complete search history.

(56) References Cited

U.S. PATENT DOCUMENTS

| | | | | |
|---|---|---|---|---|
| 2003/0020421 A1* | 1/2003 | Vu | ............................ | G01D 3/08 318/442 |
| 2011/0273125 A1* | 11/2011 | Yamada | ................ | H02P 27/085 318/503 |
| 2015/0022126 A1* | 1/2015 | Schulz | .................... | H02P 29/60 318/400.02 |
| 2016/0277208 A1* | 9/2016 | Petrucci | ................. | G08C 23/04 |

(Continued)

OTHER PUBLICATIONS

Learnchannel, "How does a Resolver work?—Technical animation", Feb. 20, 2018, Published at website: https://www.youtube.com/watch?v=7PKJ52b1Qvs (Year: 2018).*

*Primary Examiner* — Todd Melton
*Assistant Examiner* — Jason R Roberson
(74) *Attorney, Agent, or Firm* — Quinn IP Law

(57) ABSTRACT

An electric powertrain includes a sensor-controller interface, an inverter-controller electrically connected to the battery pack, and an electric machine connected to the inverter-controller and having a rotor with an angular position. The rotor powers a driven load at a torque and/or speed level controlled by the inverter-controller in response to position signals indicative of the angular position. A rotary position sensor is operatively connected to the rotor to generate and output the position signals. The sensor derives the position signals from unmodulated sine and cosine signals, and communicates the position signals and a binary sensor state of health (SOH) to the inverter-controller over the interface. The inverter-controller also decodes the position signals and the binary sensor SOH to generate decoded control data, and controls the torque and/or speed level using the decoded control data.

20 Claims, 4 Drawing Sheets

(56) References Cited

U.S. PATENT DOCUMENTS

2018/0074499 A1* 3/2018 Cantrell ............... G05D 1/0088
2018/0128658 A1* 5/2018 Ochs .................... G01D 5/2448
2018/0229761 A1* 8/2018 Fujita ................... B62D 5/049

* cited by examiner

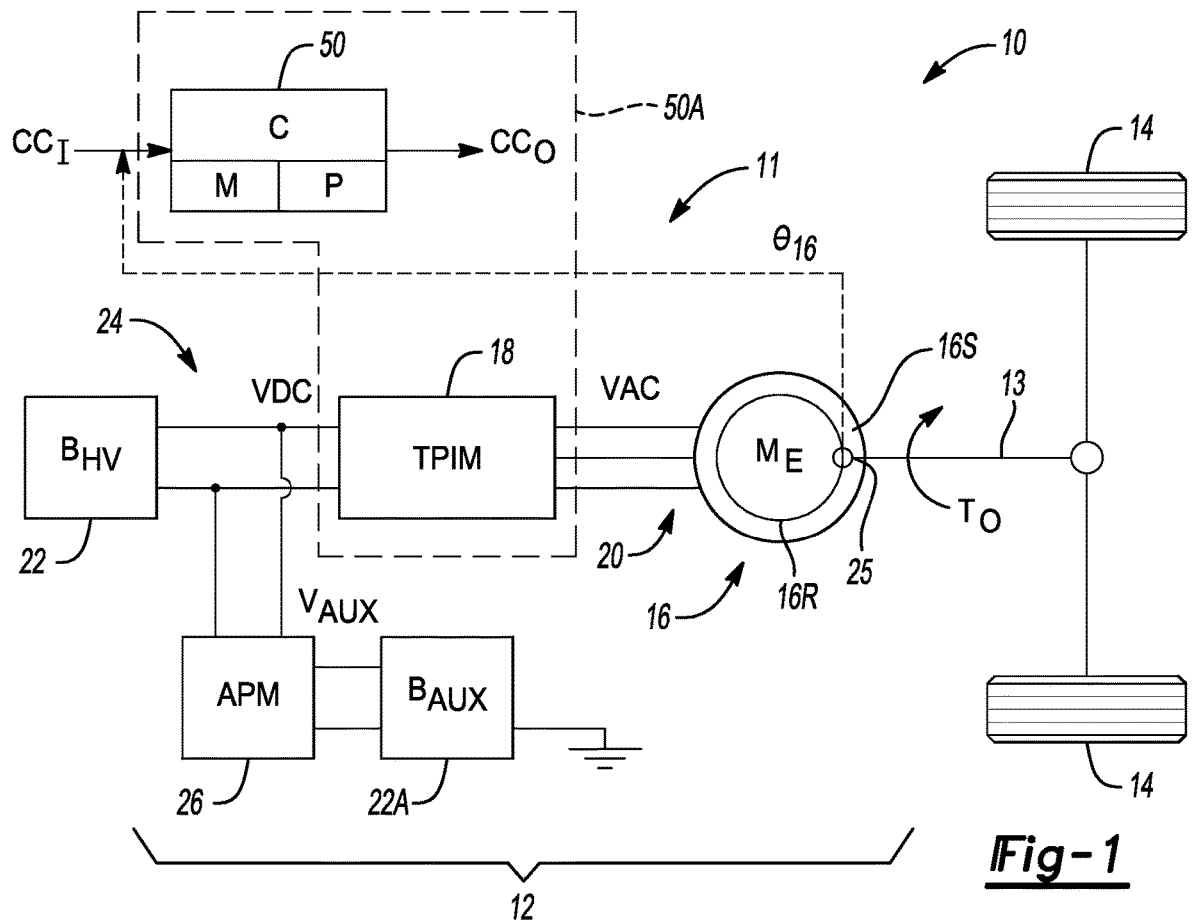
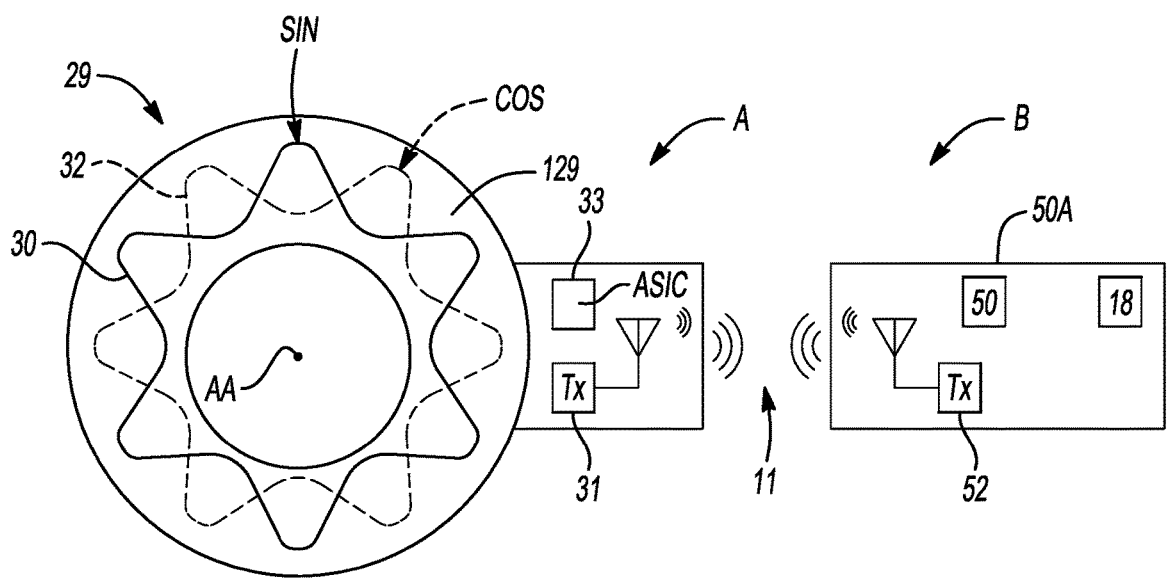

ELECTRIC POWERTRAIN WITH ROTARY ELECTRIC MACHINE AND POSITION SENSOR-TO-CONTROLLER INTERFACE

INTRODUCTION

The present disclosure relates to a rotary electric powertrain having a rotary electric machine that is coupled to a driven load, e.g., road wheels of a motor vehicle or another mobile platform. Individual phase windings of the electric machine are connected to a traction power inverter and operatively controlled via a motor controller in response to an angular position, with the angular position determined using a rotary position sensor. In particular, the present disclosure provides a wireless communications interface between the rotary position sensor and the motor controller.

As will be appreciated by those of ordinary skill in the art, reluctance-based resolvers are typically used as rotary position sensors in electric powertrains to output modulated sine and cosine output signals indicative of a changing angular position of the machine's rotor. Rotor position and speed are derived by the motor controller from the modulated output signals and thereafter regulated by the motor controller during ongoing operation of the electric machine. Emerging position sensor technologies such as inductive sensors differ in their ability to output pure/unmodulated sine and cosine signals by virtue of the sensor's integrated circuit and associated control logic.

In a polyphase embodiment of a rotary electric machine, individual phase windings of the machine's stator are sequentially energized to generate a rotating stator field. The rotating stator field ultimately interacts with a fixed magnetic field of the machine's rotor in order to produce machine rotation and output torque. The generated output torque is thereafter harnessed using gear sets, pulleys, or another suitable torque transfer mechanisms and directed to a load, e.g., a set of road wheels of a motor vehicle or another mobile platform.

SUMMARY

An electric powertrain is disclosed herein. In an exemplary embodiment, the electric powertrain includes a rotary electric machine, a rotary position sensor, a power inverter, and a controller. The power inverter and controller operate as an integral unit during ongoing torque and speed control of the electric machine, with switching operation of the power inverter regulated by the controller in real time in response to input signals. Due to the integrally related functions of the power inverter and controller, the two components are referred to hereinafter as an "inverter-controller". A wireless interface connects the position sensor to the inverter-controller, with data transfer occurring over wireless pathways in accordance with the several embodiments set forth below.

The disclosed electric powertrain and wireless interface are intended to address a potential problem common to electric powertrains, and in particular to electric powertrains of motor vehicles and other electromechanical systems prone to mechanical vibration and electromechanical noise. Over time, such vibration and noise may cause the premature failure of physical end connectors used to join the ends of wire transfer conductors. The wireless interface of the present approach uses a rotary position sensor having a resident ASIC and transceiver/transmitter in lieu of such physical end connectors and hardwired transfer conductors. As a result, the present teachings provide a reliable data link between specific types of rotary position sensor, e.g., inductive position sensors, and the above-noted inverter-controller.

An electric powertrain according to an exemplary embodiment includes a sensor-controller interface, and an inverter-controller electrically connected to a battery pack, and having a traction power inverter module (TPIM) and a motor controller. The electric powertrain further includes a rotary electric machine electrically connected to the TPIM and having a rotor with an angular position. The rotor is configured to power a driven load at a torque and/or speed level controlled by the inverter-controller in response to position signals indicative of the angular position of the rotor.

As part of the electric powertrain, a rotary position sensor is operatively connected to the rotor and configured to generate and output the position signals. The position sensor, e.g., an inductive position sensor, is configured to derive the position signals from unmodulated sine and cosine signals, and to communicate the position signals and a binary sensor state of health (SOH) to the inverter-controller over the sensor-controller interface. The inverter-controller is configured to decode the position signals and the binary sensor SOH to generate decoded control data, and to control the torque and/or speed level of the electric machine using the decoded control data.

The sensor-controller interface may be a wireless interface in which the position sensor includes a wireless transmitter. The interface may be an infrared (IR) interface in some embodiments, with the wireless transmitter being an IR transmitter. The inverter-controller may include an IR repeater which operates in conjunction with the IR transmitter using a near-field infrared data association (irDA) protocol.

A backup low-voltage, e.g., nominal 5V, power supply may be electrically connected to the position sensor.

The inverter-controller may be configured to transmit the position signals as a set of digital data packets, and in some embodiments includes a media converter block configured to receive and process the digital data packets. The media converter block may be coupled to a de-serializer block via a twisted two-wire connection.

The inverter-controller in some configurations is configured to decode the position signal using a cyclic redundancy check block or a bit filter.

The inverter-controller may optionally generate an error signal by subtracting a derivative of the angular position from an angular speed of the rotor, and may determine a true state of the position sensor using the error signal. The inverter-controller may also execute another control action in response to the error signal exceeding a calibrated threshold.

The driven load in an optional configuration is or includes a set of road wheels of a mobile platform.

The inverter-controller may include a differential transmitter, the sensor-controller interface may include low-voltage power lines, and the position sensor may communicate the position signals to the inverter-controller over the low-voltage power lines using the differential transmitter.

Also disclosed herein is a method for controlling a rotary electric powertrain having the above-noted inverter-controller and electric powertrain. The method may include connecting a rotary position sensor to a rotor of the electric machine, and then commanding a torque and/or speed level from the electric machine, via the inverter-controller, to thereby power a driven load. While this occurs, the method may include generating angular position signals via the position sensor from unmodulated sine and cosine signals, and wirelessly communicating the angular position signals to the inverter-controller using a wireless transmitter while the electric machine powers the driven load. The method may also include receiving and decoding the position signals via the inverter-controller. Thereafter, the torque and/or speed level of the electric machine is regulated or controlled via the inverter-controller in response to the angular position signals to thereby power the driven load.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

BRIEF DESCRIPTION OF THE DRAWINGS

FIG. 1 is a schematic illustration of an exemplary mobile platform having an electric powertrain having a wireless sensor-to-controller interface as set forth herein.

FIG. 2 is a schematic depiction of an exemplary rotary position sensor that is wirelessly connected to an inverter-controller for use with a rotary electric machine.

Figure 3:
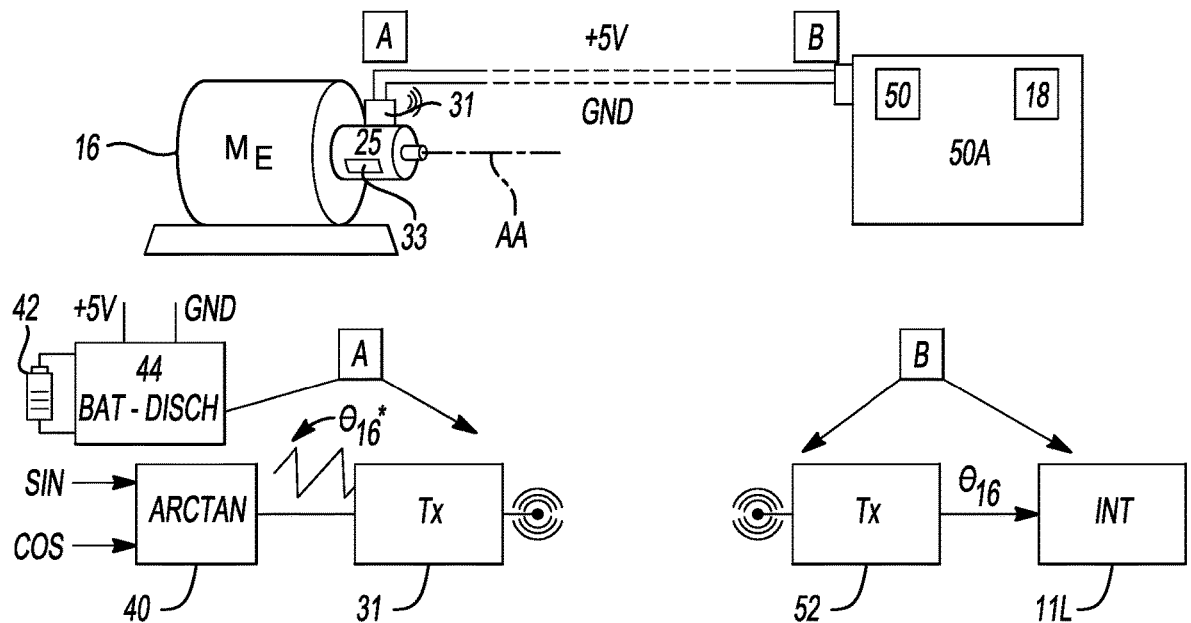
FIGS. 3, 4, and 5 are schematic illustrations of possible embodiments for implementing the wireless interface shown in FIG. 1.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, a mobile platform 10 having an electric powertrain 12 is depicted schematically in FIG. 1. The electric powertrain 12 includes a rotary electric machine (ME) 16 whose angular position and speed are determined using a rotary position sensor 25, the structure and functionality of non-limiting exemplary embodiments of which being described below with particular reference to FIG. 2. The position sensor 25 is electrically connected to a motor controller (C) 50 over a wireless communications interface 11, with the wireless communications interface 11 configured in accordance with the schematic architectures exemplified in FIGS. 3-5. Signal decoding at the controller 50 and a traction power inverter module (TPIM) 18 may be performed using the example logic of FIG. 6 according to the method of FIG. 7.

The mobile platform 10 of FIG. 1 may be variously constructed as a passenger or commercial hybrid or battery electric vehicle, tracked vehicle, motorcycle, off-road and all-terrain vehicle, with the electric powertrain 12 also being usable as part of a robot, power plant, hoist, or other systems. Vehicular applications of the electric powertrain 12 may include various types of motor vehicles, tractors or other agricultural or farm equipment, aircraft, watercraft, or rail vehicles. For illustrative consistency, the mobile platform 10 of FIG. 1 will be described hereinafter in the context of a motor vehicle without limiting the present teachings to such embodiments.

In the illustrated embodiment of FIG. 1, the mobile platform 10 includes a set of road wheels 14, with each road wheel 14 in rolling contact with a road surface (not shown). The rotary electric machine 16 is operable as an electric traction motor such that output torque (arrow $T_O$) from the electric machine 16 may be directed to one or more of the road wheels 14. One such electric machine 16 is depicted in FIG. 1 for illustrative simplicity. However, other embodiments may include multiple such electric machines 16 each arranged to provide a respective output torque (arrow $T_O$) at a particular point or node within the electric powertrain 12. Likewise, the electric powertrain 12 may include a transmission or gear box (not shown), with the electric machine 16 possibly delivering output torque (arrow $T_O$) thereto. Therefore, the simplified embodiment of FIG. 1 is intended to be illustrative of the present teachings, generic, and non-limiting.

The electric machine 16 includes a cylindrical rotor 16R and stator 16S, and may be embodied as a polyphase/alternating current (AC) electric machine, e.g., an electric traction or propulsion motor. In such an embodiment, the stator 16S is connected to the TPIM 18 via an AC voltage bus 20. The TPIM 18 in turn is electrically connected to a high-voltage battery pack ($B_{HV}$) 22 via a direct current (DC) voltage bus 24. The electric machine 16 is thus energized by discharge of constituent battery cells (not shown) of the battery pack 22 via operation of the intervening TPIM 18 to generate the output torque (arrow $T_O$), which is thereafter delivered to the road wheels 14 to propel the mobile platform 10 and/or perform other useful work.

The high-voltage battery pack 22 may be embodied as a multi-cell high-energy energy storage device constructed from a lithium ion, zinc-air, nickel-metal hydride, or another application-suitable battery chemistry. A DC voltage (VDC) present on the DC voltage bus 24 at an application-suitable level is thus inverted by operation of the TPIM 18, as will be appreciated by those of ordinary skill in the art, to provide an AC voltage (VAC) on the AC voltage bus 20. In some embodiments, the electric powertrain 12 may include an auxiliary power module (APM) 26 connected to the DC voltage bus 24 and to an auxiliary battery ($B_{AUX}$) 28. The APM 26 is configured to reduce the voltage level present on the DC voltage bus 24 to auxiliary voltage levels ($V_{AUX}$), e.g., 12-15V in a typical vehicular embodiment.

With respect to the controller 50, this electronic control device or multiple such devices includes at least one motor control processor (P) and sufficient memory (M) for regulating torque and speed operations of the electric machine 16. As part of the assigned control functions of the controller 50, control parameters are measured, estimated, and/or otherwise determined within the electric powertrain 12 and relayed to the controller 50 as input signals (arrow $CC_I$). The input signals (arrow $CC_{I1}$) include an angular position of the rotor 16R, as well as other possible parameters. Angular position (arrow $\theta_{16}$) is output by the position sensor 25, as depicted in FIG. 2, which in turn is connected to or integrally formed with the rotor 16R of the electric machine 16.

As will be appreciated by those having ordinary skill in the art, for an exemplary 8-pole embodiment of the electric machine 16, one complete mechanical revolution of the rotor 16R will result in an electrical angle completing four 0° to 360° electrical cycles. The position sensor 25 of FIG. 1 may be embodied as a new generation of rotary position sensor, i.e., an inductive position sensor or another suitable sensor of the type that uses microcontrollers or ASICs residing on or within the position sensor 25 to output the angular position (arrow $\theta_{16}$). Additionally, the present approach takes the communication of unmodulated data one step further by replacing hardwired connections between the position sensor 25 and controller 50, or more precisely between the position sensor 25 and inverter-controller 50A, with the wireless interface 11, over which the angular position (arrow $\theta_{16}$) is transmitted. Various approaches for implementing the wireless interface 11 within the electric powertrain 12 will now be described below with reference to FIGS. 2-7.

Referring to FIG. 2, the position sensor 25 used herein relies on the eddy current principle and the principles of induction to ultimately generate the angular position (arrow $\theta_{16}$) of FIG. 1. As will be appreciated by those of ordinary skill in the art, such sensors include a sensor rotor (not shown) constructed of a conductive material such as copper, aluminum, or steel, which is arranged coaxially with the rotor 16R of the electric machine 16. The sensor rotor includes multiple rotor lobes centered around an inner diameter opening, with the number of such lobes matching the number of magnetic pole pairs. The position sensor includes a printed circuit board assembly (PCBA) 29 with a major surface 129 etched with copper traces 30 and 32 forming respective sine (SIN) and cosine (COS) signal traces. The PCBA 29, which acts as a sensor stator to the above-noted rotor sensor, includes a transceiver (Tx) 31 and an ASIC 33, with the ASIC 33 being configured to generate excitation signals and output the angular position (arrow $\theta_{16}$) of FIG. 1 to indicate the rotary position of the rotor 16R. The position sensor 25 is in remote/wireless communication with the inverter-controller 50A over the wireless interface 11. The inverter-controller 50A is thereby made aware of the instantaneous angular position and speed of the rotor 16R during operation of the electric machine 16.

Figure 4:
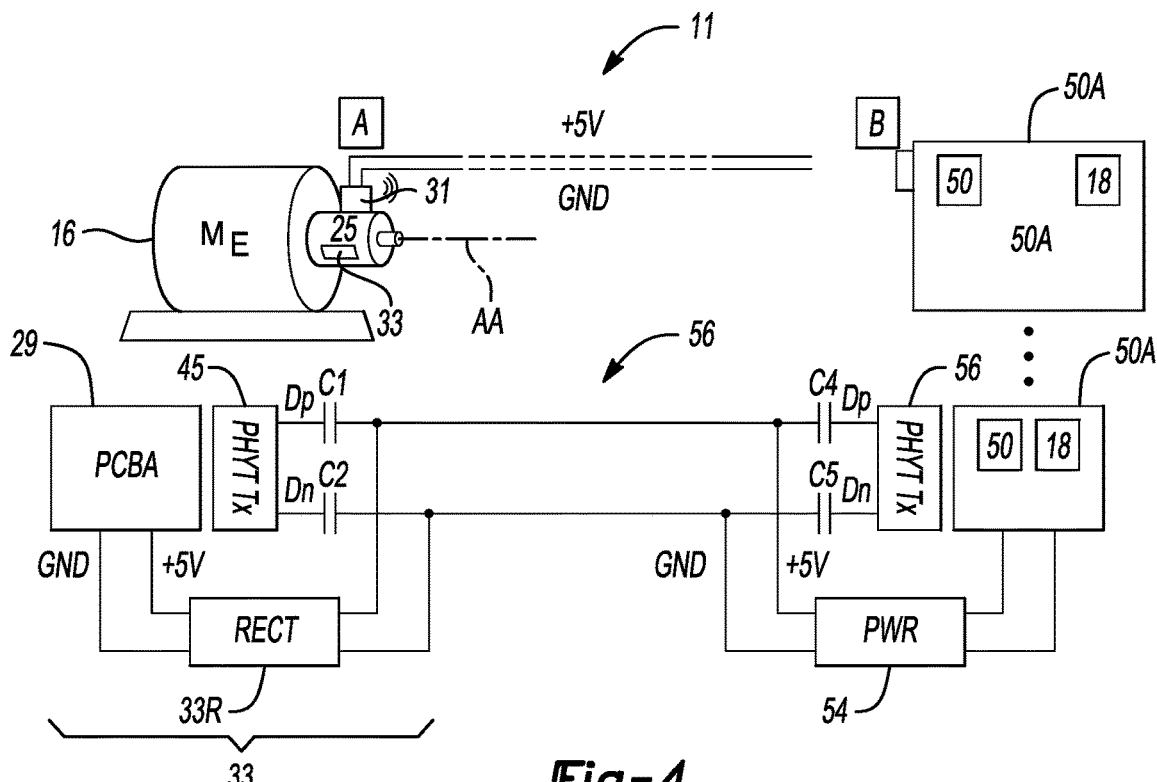
Figure 5:
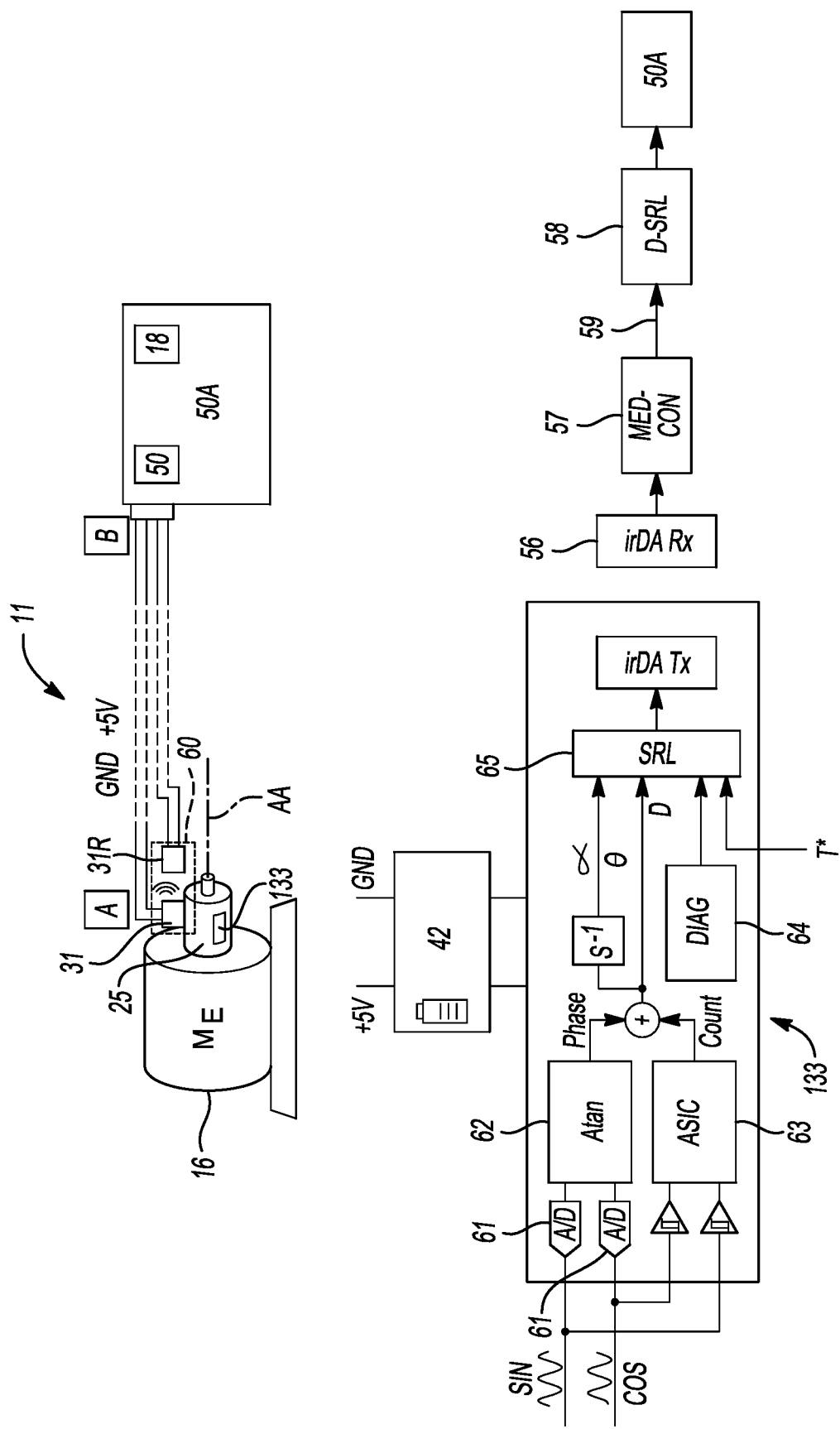

Possible embodiments for implementing the wireless interface 11 in the electric powertrain 12 of FIG. 1 are depicted in FIGS. 3-5, each of which depicts the electric machine 16 in wireless communication with the inverter-controller 50A. For illustrative clarity, sending/transmitting and receiving terminals are labeled A and B. Referring first to FIG. 3, and as noted above, the position sensor 25 produces pure/unmodulated sine/cosine signals, which may be processed via the ASIC 31, e.g., using an arctan function block 40 and/or other suitable demodulator circuit to produce an angular position (arrow $\theta_{16}$*) between 0° and 360°. A particular embodiment of the position sensor 25 may provide an angle resolution of 0.1° with 12-bit resolution and 0.25° accuracy, with the sensor 25 possibly configured to operate at a maximum rotational speed of 25000 RPM.

The angular position (arrow $\theta_{16}$*) measured or derived via the ASIC 33 is transmitted via the transceiver 31 to the inverter-controller 50A, where the transmitted position is received at the receiving terminal B. To ensure uninterrupted operations, the transmitting terminal A may include a small backup power supply 42, e.g., a small 5V lithium-ion battery and associated discharger (BAT-DISCH) 44 to ensure sufficient power is present for energizing processing and transmission functions of the position sensor 25.

At the receiving terminal B proximate the inverter-controller 50A, the inverter-controller 50A receives the angular position (arrow $\theta_{16}$) communicated by the transceiver 31 via another transceiver (Tx) 52 or an optional receiver and processes the angular position via associated wireless interface logic (INT) 11L. If calculated by the ASIC 33, the inverter-controller 50A also may receive a corresponding angular speed of the rotor 16R, or the inverter-controller 50A may derive the angular speed from the received angular position (arrow $\theta_{16}$). As set forth below, additional data may be transmitted wirelessly between the terminals A and B, such as a diagnostic signal from the position sensor 25 in the form of a binary/0 or 1 value, which itself may be indicative of the state of health (SOH) of the position sensor 25 or a specific function thereof, along with a possible wireless signal validity signal or other suitable information. The exemplary architecture shown schematically in FIG. 3 thus eliminates physical transfer conduction lines extending between the position sensor 25 and the inverter-controller 50A, replaces such lines with the illustrated wireless interface 11, and ensures availability of a 5V power supply to the position sensor 25 using the backup power supply 42.

As an alternative to the wireless architecture depicted in FIG. 3, an improved wired connection may be provided as shown in FIG. 4. For instance, communications pathways typically used to transmit data packages from the position sensor 25 to the inverter-controller 50 may occur over power lines 55, e.g., an RS485 or CAN FD connection. Such an approach, while not wireless, would still reduce pin and wire count relative to typical hardwired data lines, and would also enable high-speed digital communication that is more robust to harsh electromagnetic operating environments.

In the exemplary embodiment of FIG. 4, for instance, the PCBA 29 acting as the sensor board for the position sensor 25 may be connected to a rectifier 33R of the above-noted ASIC using via low-voltage and ground (GND) lines, with low-voltage being nominally 5V in the illustrated configuration. Point-to-point transmission of data between terminals A and B may occur using high/low lines (Dp, Dn) that are output from a differential transmitter 45 at terminal A and received at terminal B via a similarly configured receiver 56, with line capacitors C1, C2, C3, and C4 positioned on the power lines 55. Thus, power may be supplied at +5V to the Dp line at terminal B, with such a power supply 54 possibly being a dedicated low-voltage battery or a +5V output of the APM 26 of FIG. 1.

FIG. 5 depicts yet another embodiment of the wireless interface 11. An electromagnetic interference (EMI) shielding box 60 containing a transceiver 31 and a repeater 31R is mounted to the position sensor 25 at the transmitting/sending terminal A. In a possible embodiment, the transceiver 31 and repeater 31R may operate in the infrared (IR) portion of the electromagnetic spectrum using a suitable communications protocol, e.g., near-field infrared data association (irDA). Alternatively, the transceiver 31 and repeater 31R may operate using another suitable wireless convention, such as but not limited to a wireless personal area network (WPAN).

In either embodiment, an ASIC 133 configured as depicted in FIG. 5 may be connected to the backup power supply 42 and used to derive the angular position (arrow $\theta_{16}$), doing so at the location of the electric machine 16 as opposed to the inverter-controller 50A. When the position sensor 25 is embodied as a rotary position sensor of the type described generally above, excitation of the position sensor 25 causes the position sensor 25 to output pure or unmodulated sine and cosine signals, as noted above with reference to FIG. 2. The ASIC 133 may then derive the angular position (arrow $\theta_{16}$) from such data.

For example, at terminal A the ASIC 133 may receive the pure sine and cosine signals, abbreviated SIN and COS in FIG. 5, and process these signals through a respective analog-to-digital (A/D) converter block 61 before processing the digital output of blocks 61 through an A tan function block 62 to derive the electrical phase (ϕ). At the same time, a quadrature encoder counter block 63 may be used to generate a pulse count (N). The outputs of block 62 and 63 are summed to thereby calculate the angular position (θ), which may be processed via an integrator block ($s^{-1}$) to derive the angular speed (α) of the rotor 16R.

As mentioned above, the ASIC 133 may also provide a binary diagnostic signal (arrow D) indicative of the SOH or status of the position sensor 25, e.g., from a separate diagnostic (DIAG) functional block 64 of the electric machine 16, as well as a torque signal (T*) indicative of the commanded output torque from the electric machine 16. The ASIC 133 may additionally include a serializer block (SRL) 65, which as will be appreciated is a processing functional block which arranges data into organized data packets before communicating the same to the transceiver 31.

At the receiving terminal B, the data packets are received by the transceiver 56, which is labeled irDAtx in FIG. 5 to show a representative IR receiver, and possibly fed into a media converter block (MED-CON) 57. The media converter block 57 may be coupled to a de-serializer block (D0SRL) 58 via a digital twisted 2-wire connection 59, e.g., LVDS, MIPI 13C/A-PHY, etc., and thereafter communicated to the inverter-controller 50A. Use of the media converter block 57 may enable the inverter-controller 50A to be positioned a greater distance apart from the receiver 56, as will be understood in the art.

Figure 6:
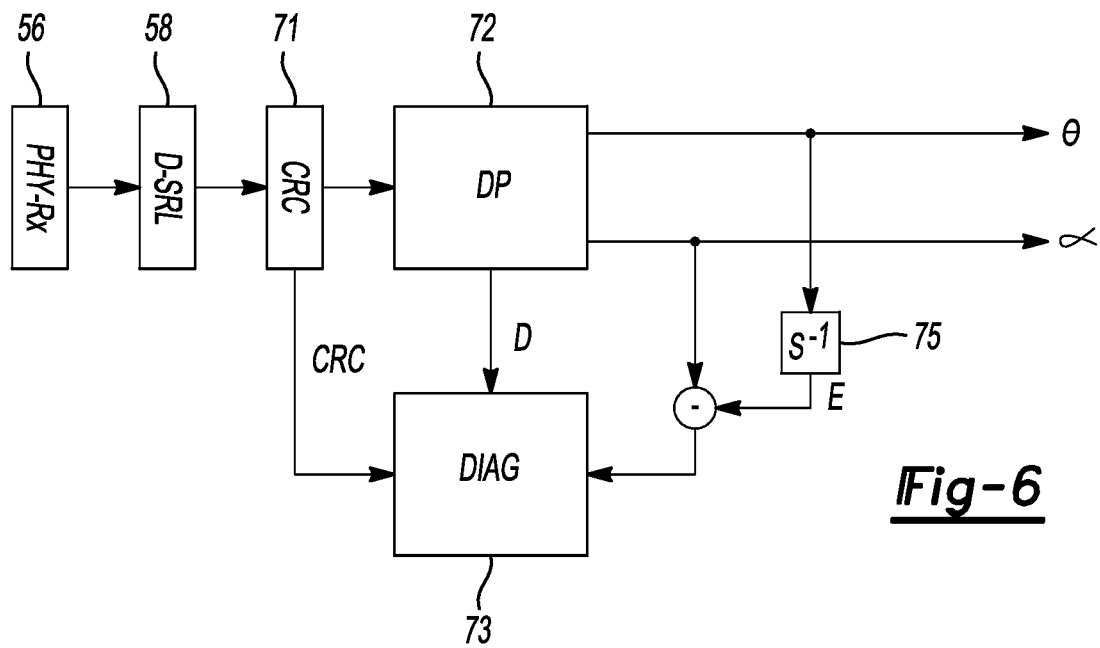
FIG. 6 is a schematic illustration of exemplary signal decoding logic for use with the inverter-controller of FIGS. 1 and 2.
Figure 7:
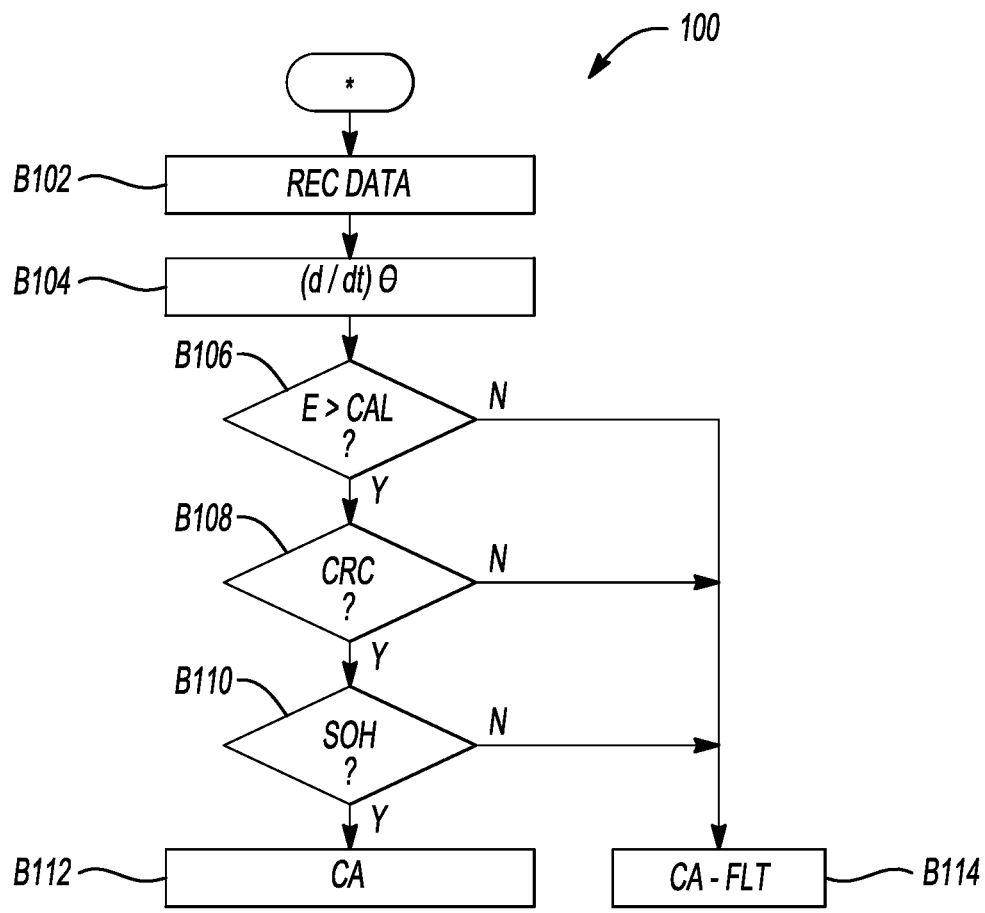
FIG. 7 is a flow chart describing a method of using the signal decoding logic of FIG. 6.

Referring to FIGS. 6 and 7, the inverter-controller 50A may be optionally configured to perform a signal decoding process using the logic circuit of FIG. 6. According to an embodiment of the method 100 of FIG. 7, and in response to the angular position signals (arrow $\theta_{16}$) received from the transmitting terminal A, i.e., from the position sensor 25 of the electric machine 16, the inverter-controller 50A may receive, via (PHY-Rx) block 56 and parse data from the de-serializer block (D-SRL) 58 of FIG. 5. Such data may be fed into a cyclic redundancy check (CRC) block 71 or a comparable bit filter, which in turn is configured to detect errors or unexpected changes in the stream of raw data, as will be understood by those of ordinary skill in the art.

After initiation (*) of the method 100, and as part of block B102, a data parsing block (DP) 72 may be used to separate the above-noted diagnostic data, e.g., sensor board SOH, torque, etc., from the associated angular position and speed data. The angular position θ and speed α are used by the inverter-controller 50A for the control of a torque or speed function of the electric machine 16 of FIGS. 1 and 3-5, while the sensor board diagnostic signal (D/SOH) noted above with reference to FIG. 5 is communicated to a diagnostic function block 73 and used by the inverter-controller 50A to perform a periodic or ongoing check of the true sensor state.

At block B104, the derivative of the angular position θ, i.e., θ̇, may be processed through a calculation block 75 ($s^{-1}$) to determine and thereafter subtracted at a node (−) from angular speed α to thereby generate an error signal (arrow E). The error signal (arrow E) may be fed into the above-noted diagnostic function block 73. The diagnostic function block 73 may therefore receive three different signals: (1) the sensor board diagnostic signal or SOH signal from the data parsing block 72, (2) the CRC status from the CRC check block 71, and (3) the error signal (arrow E) from the integrator 75. The diagnostic function block 73 may thereafter process the received signals and thereby calculate a true state of the position sensor 25, with the inverter-controller 50A taking requisite corrective action in response to the values of such signals relative to a threshold value.

The inverter-controller 50A may optionally perform a series of checks to ensure that the electric machine 16 and/or the position sensor 25 is not presently operating in an error state. At block B106, the inverter-controller 50A may determine whether the error signal (arrow E) exceeds a calibrated threshold value (E>CAL). The method 100 proceeds to block B108 when the error signal (arrow E) does not exceed the calibrated threshold value, and to block B114 when the error signal exceeds the calibrated threshold value.

As the next check in the optional series of checks, the inverter-controller 50A may verify whether the CRC status resulting from operation of the CRC check block 71 is passing or satisfactory. The method 100 proceeds to block B110 when this is the case, and to block B114 in the alternative when the CRC status is failing or otherwise unsatisfactory.

Block B110 likewise includes verifying, via the inverter-controller 50A, whether the sensor state of health (SOH) from the data parsing block 72 has a passing/satisfactory status, in which case the inverter-controller 50A proceeds to block B112. The method 100 proceeds to block B114 when the sensor SOH is failing/unsatisfactory.

At block B112, the inverter-controller 50A may execute a control action (CA) in response to successful completion of the series of checks performed in block B106, B108, and B110. For example, the inverter-controller 50A may monitor the angular speed and increase or decrease torque or speed of the electric machine 16 based on a difference between the actual torque or speed as determined via the position sensor 25 and a desired torque or speed as requested by a human or autonomous operator of the mobile platform 10 of FIG. 1.

At block B114, the inverter-controller 50A may execute a control action in response to a fault state (CA-FLT) occurring during one of the checks conducted in blocks B106, B108, or B110. Possible control actions that may be executed in block B114 in response to such a fault state include recording and/or communicating a diagnostic code indicative of the failed check and/or activating an audio and/or visual alert.

As will be appreciated, the present disclosure enables a method for controlling the electric powertrain 11. An embodiment of such a method may include operatively connecting the rotary position sensor or assembly 25 to the rotor 16R of the electric machine 16 shown in FIG. 1, and commanding a torque and/or speed level from the electric machine 16, via the inverter-controller 50A, to thereby power a driven load, e.g., the road wheels 14. The method may include generating the angular position signals (arrow $\theta_{16}$) via the position sensor 25 from an unmodulated sine and cosine signals, and wirelessly communicating the angular position signals to the inverter-controller 50A using the wireless transmitter 31 while the electric machine 16 powers the driven load. Such a method may also include receiving and decoding the position signals (arrow $\theta_{16}$) via the inverter-controller 50A, and thereafter regulating the torque and/or speed level of the electric machine 16 via the inverter-controller 50A in response to the angular position signals to thereby power the driven load.

Using the communications interface 11 in its various disclosed embodiments, angular position, speed, and other data may be determined via an impedance-based position sensor 25 using a resident ASIC 33 and communicated to the inverter-controller 50 over a wireless connection or hardwired power lines. In this manner, a more robust noise-resistant data link may be formed between the position sensor 25 onboard the mobile platform 10, and thus subject to vibration and EMI noise, and the inverter-controller 50A located a distance apart from the position sensor 25.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An electric powertrain comprising:
    a sensor-controller interface;
    a battery pack;
    an inverter-controller electrically connected to the battery pack, and having a traction power inverter module (TPIM) and a motor controller;
    a rotary electric machine electrically connected to the TPIM, and having a rotor with an angular position, wherein the rotor is configured to power a driven load at a torque and/or speed level controlled by the inverter-controller in response to position signals indicative of the angular position of the rotor; and
    a rotary position sensor operatively connected to the rotor and configured to generate and output the position signals, wherein the position sensor is configured to derive the position signals from unmodulated sine and cosine signals, and to communicate the position signals and a binary sensor state of health (SOH) to the inverter-controller over the sensor-controller interface;
    wherein the inverter-controller is configured to:
        decode the position signals and the binary sensor SOH to generate decoded control data, and to control the torque and/or speed level of the electric machine using the decoded control data;
        generate an error signal by subtracting a derivative of the angular position from an angular speed of the rotor;
        determine a true state of the position sensor using the error signal; and
        execute a control action in response to the error signal exceeding a calibrated threshold.

2. The electric powertrain of claim 1, wherein the sensor-controller interface is a wireless interface, and wherein the position sensor includes a wireless transmitter.

3. The electric powertrain of claim 2, wherein the wireless interface is an infrared (IR) interface and the wireless transmitter is an IR transmitter.

4. The electric powertrain of claim 3, wherein the inverter-controller includes an IR repeater which operates in conjunction with the IR transmitter using a near-field infrared data association (irDA) protocol.

5. The electric powertrain of claim 1, further comprising: a backup low-voltage power supply that is electrically connected to the position sensor.

6. The electric powertrain of claim 1, wherein the inverter-controller is configured to transmit the position signals as a set of digital data packets, and the inverter-controller includes a media converter block configured to receive and process the digital data packets, the media converter block being coupled to a de-serializer block via a twisted two-wire connection.

7. The electric powertrain of claim 6, wherein the inverter-controller is configured to decode the position signal using a cyclic redundancy check block or a bit filter.

8. The electric powertrain of claim 1, wherein the driven load includes a set of road wheels of a mobile platform.

9. The electric powertrain of claim 1, wherein the inverter-controller includes a differential transmitter, the sensor-controller interface includes low-voltage power lines, and the position sensor communicates the position signals to the inverter-controller over the low-voltage power lines using the differential transmitter.

10. A method for controlling a rotary electric powertrain having an inverter-controller that is electrically connected to a battery pack and includes a rotary electric machine, a traction power inverter module, and a motor controller, the method comprising:
    operatively connecting a rotary position sensor to a rotor of the electric machine;
    commanding a torque and/or speed level from the electric machine, via the inverter-controller, to thereby power a driven load;
    generating angular position signals via the rotary position sensor from an unmodulated sine and cosine signals;
    wirelessly communicating the angular position signals to the inverter-controller using a wireless transmitter while the electric machine powers the driven load;
    receiving and decoding the position signals via the inverter-controller; and
    regulating the torque and/or speed level via the inverter-controller in response to the angular position signals to thereby power the driven load;
    using the inverter-controller to generate an error signal by subtracting a derivative of the angular position from an angular speed of the rotor;
    determining a true state of the position sensor using the error signal; and
    executing a control action via the inverter-controller in response to the error signal exceeding a calibrated threshold.

11. The method of claim 10, further comprising: providing low-voltage backup power to the position sensor via a backup power supply.

12. The method of claim 10, further comprising: outputting a binary diagnostic signal via the position sensor indicative of a state of health of the position sensor.

13. The method of claim 10, wherein the rotary position sensor also includes a repeater, and wherein wirelessly communicating the angular position signals to the inverter-controller occurs via the transmitter and repeater in the infrared (IR) spectrum via an IR communications protocol.

14. The method of claim 10, wherein the rotary position sensor is an inductive position sensor.

15. The method of claim 10, further comprising:
    transmitting the position signals as a set of digital data packets using a wireless transmitter of the position sensor;
    using a media converter block of the inverter-controller coupled to a de-serializer block via a twisted two-wire connection to process the digital data packets; and
    decoding the position signal using a cyclic redundancy check block or bit filter of the inverter-controller.

16. The method of claim 10, wherein the driven load includes a set of road wheels of a mobile platform.

17. A mobile platform comprising:
a set of road wheels;
a wireless sensor-controller interface;
a battery pack;
an inverter-controller electrically connected to the battery pack, and having a traction power inverter module (TPIM) and a motor controller;
a rotary electric machine electrically connected to the TPIM of the inverter-controller and having a rotor with an angular position, wherein the rotor is configured to impart a corresponding torque to the road wheels at a level controlled by the inverter-controller in response to position signals indicative of the angular position of the rotor; and
a rotary position sensor operatively connected to the rotor and configured to output the position signals, and having a backup low-voltage power supply, wherein the rotary position sensor includes an application-specific integrated circuit (ASIC) configured to derive the position signals from unmodulated sine and cosine signals, and to communicate the position signals and a binary sensor state of health (SOH) to the inverter-controller in digital data packets over the wireless sensor-controller interface, wherein the inverter-controller:

includes a media converter block that receives and processes the digital data packets, is coupled to a de-serializer block via a twisted two-wire connection, and is configured to decode the position signals and the binary sensor SOH to generate decoded control data and thereafter control a torque and/or speed operation of the electric machine using the decoded control data when powering the road wheels; and
is configured to generate an error signal by subtracting a derivative of the angular position from an angular speed, and to determine a true state of the position sensor using the error signal, and wherein the inverter-controller is configured to execute a control action in response to the error signal exceeding a calibrated threshold.

18. The mobile platform of claim 17, wherein the rotary position sensor is an inductive position sensor.

19. The electric powertrain of claim 8, wherein the mobile platform is a motor vehicle.

20. The method of claim 16, wherein the mobile platform is a motor vehicle.

* * * * *